(12) United States Patent
Lo et al.

(10) Patent No.: US 7,740,290 B2
(45) Date of Patent: Jun. 22, 2010

(54) ELECTRONIC DEVICE

(75) Inventors: Chien-Sheng Lo, Taipei (TW);
Hung-Cheng Lee, Taipei (TW);
Yu-Yuan Chen, Taipei (TW); Ying-Chi Chou, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 230 days.

(21) Appl. No.: 11/772,832

(22) Filed: Jul. 3, 2007

(65) Prior Publication Data
US 2008/0123260 A1 May 29, 2008

(30) Foreign Application Priority Data
Jul. 3, 2006 (TW) .............................. 95124109 A

(51) Int. Cl.
*E05C 1/08* (2006.01)
*E05C 1/02* (2006.01)

(52) U.S. Cl. ........................ 292/163; 292/137; 292/150; 292/DIG. 11; 292/DIG. 37; 361/679.57; 361/679.58

(58) Field of Classification Search ................. 292/137, 292/146, 150, 163, DIG. 11, DIG. 37; 361/679.57, 361/679.58
See application file for complete search history.

(56) References Cited

U.S. PATENT DOCUMENTS

| | | | |
|---|---|---|---|
| 6,125,040 A * | 9/2000 | Nobuchi et al. ............. | 361/726 |
| 6,707,665 B2 * | 3/2004 | Hsu et al. ............. | 361/679.58 |
| 6,847,520 B2 * | 1/2005 | Hashimoto ............ | 361/679.01 |
| 6,870,740 B2 * | 3/2005 | Hsu et al. .................... | 361/732 |
| 6,965,512 B2 | 11/2005 | Huang et al. | |
| 7,050,295 B2 * | 5/2006 | Kang .................... | 361/679.58 |
| 7,054,149 B2 * | 5/2006 | Lev et al. ............... | 361/679.58 |
| 7,184,262 B2 * | 2/2007 | Hsu et al. ............... | 361/679.27 |
| 2005/0180562 A1 * | 8/2005 | Chiang ........................ | 379/445 |
| 2007/0103860 A1 * | 5/2007 | Lo et al. ...................... | 361/683 |

* cited by examiner

*Primary Examiner*—Carlos Lugo
(74) *Attorney, Agent, or Firm*—Jianq Chyun IP Office

(57) ABSTRACT

An electronic device includes a first housing, a first lock mechanism disposed in the first housing, a second housing, and a second lock mechanism disposed at the second housing. The first housing has a first surface. The second housing pivoted to the first housing is suitable for rotating relatively to the first housing. The second housing has a second surface and a third surface which are respectively disposed at the two opposite sides of the second housing. When the second surface is closed to the first surface and a first portion of the second slider is protruded from the second surface, the first portion is locked with the first lock mechanism. When the third surface is closed to the first surface and a second portion of the second slider is protruded from the third surface, the second portion is locked with the first lock mechanism.

15 Claims, 4 Drawing Sheets

ELECTRONIC DEVICE

CROSS-REFERENCE TO RELATED APPLICATION

This application claims the priority benefit of Taiwan application serial no. 95124109, filed Jul. 3, 2006. All disclosure of the Taiwan application is incorporated herein by reference.

BACKGROUND OF THE INVENTION

1. Field of the Invention

The present invention relates to an electronic device. More particularly, the present invention relates to an electronic device having lock mechanisms of high interactive stability when a first housing and a second housing thereof are locked together.

2. Description of Related Art

FIG. 1 is a diagram of a conventional electronic device. Referring to FIG. 1, the conventional electronic device 100 includes a first housing 110, a second housing 120, and a lock mechanism 130 for locking the first housing 110 and the second housing 120. The lock mechanism 130 mainly includes a push button 132, a spring (not shown), and a lock clasp 134, and the second housing 120 has an opening 122 for lodging the lock clasp 134. When the first housing 110 and the second housing 120 are locked together, the lock clasp 134 produces structural interference with the second housing 120 around the opening 122 so that the lock clasp 134 clasps the second housing 120.

Generally speaking, when a user is using the electronic device 100, the user first pushes the push button 132 to move the lock clasp 134 into the opening 122, so as to release the structural interference between the lock clasp 134 and the second housing 120, and then open the first housing 110. When the hand of the user leaves the push button 132, the spring makes the lock clasp 134 back to its original position.

When the user wants to lock the first housing 110 and the second housing 120, the user forces the first housing 110 to rotate relatively to the second housing 120 with a rotating shaft (not shown) of the second housing 120 as an axis so that the first housing 110 gets close to the second housing 120. When the lock clasp 134 gets in contact with the second housing 120, the guiding surface 134a of the lock clasp 134 moves along the second housing 120 at the opening 122 so that the lock clasp 134 presses the spring and enters the opening 122. Then, when the guiding surface 134a and the second housing 120 stop interfering structurally, the resilience of the spring makes the lock clasp 134 to go back to its original position and produce structural interference with the second housing 120 to lock the first housing 110 and the second housing 120.

However, the resilience of the spring is released instantaneously, thus, when the lock clasp 134 goes back to its original position to produce structural interference with the second housing 120, the lock clasp 134 is not moved back to its original position stably and is easily damaged due to collision with the second housing 120.

SUMMARY OF THE INVENTION

Accordingly, the present invention is directed to provide an electronic device having lock mechanisms of high interactive stability.

To achieve the aforementioned and other objectives, the present invention provides an electronic device including a first housing, a first lock mechanism, a second housing, and a second lock mechanism. The first housing has a first surface, and the first lock mechanism is disposed in the first housing. The second housing is pivoted to the first housing and is suitable for rotating relatively to the first housing. The second housing has a second surface and a third surface, wherein the second and the third surfaces are respectively disposed at the two opposite sides of the second housing. The second lock mechanism is disposed at the second housing. When the second surface is closed to the first surface and a first portion of the second lock mechanism is protruded from the second surface, the first portion is locked with the first lock mechanism. When the third surface is closed to the first surface and a second portion of the second lock mechanism is protruded from the third surface, the second portion is locked with the first lock mechanism.

According to an embodiment of the present invention, the first housing further includes a first shaft, and the second housing rotates relatively to the first housing with the first shaft as an axis.

According to an embodiment of the present invention, the first housing further includes a second shaft perpendicular to the first shaft, and the second housing rotates relatively to the first housing with the second shaft as an axis.

According to an embodiment of the present invention, the first housing further includes a first opening located at the first surface, and the first opening exposes a portion of the first lock mechanism.

According to an embodiment of the present invention, the first lock mechanism includes a first slider and a first elastic component. The first slider has a first locking portion disposed at the first opening. The first elastic component is disposed between the first slider and the first housing.

According to an embodiment of the present invention, the first locking portion is a lock clasp, and the first and the second portions are grooves.

According to an embodiment of the present invention, the first elastic component is a spring.

According to an embodiment of the present invention, the second housing further includes a second opening, wherein the second opening is through the second housing, and at least a guiding structure is disposed in the second housing and close to the second opening.

According to an embodiment of the present invention, the second lock mechanism includes a second elastic component, a second slider, and a connector. The second elastic component has a fixing portion and an elastic arm, and the fixing portion is fixed to the second housing. The second slider is disposed in the guiding structure, wherein the second slider has at least a pivotal portion disposed between the first portion and the second portion. The connector has a first connecting portion and a second connecting portion, wherein the first connecting portion is pivoted to the pivotal portion, and the second connecting portion is pivoted to the elastic arm.

According to an embodiment of the present invention, the second elastic component is an elastic plate, the fixing portion has at least a third opening, the connector is a wire, and the pivotal portion has a fourth opening.

According to the electronic device of the present invention, the second slider can move back and forth smoothly in the guiding structure through the connector, the elasticity of the second elastic component, and the guiding structure of the second housing. Moreover, since the interaction of the second slider will not collide with the first housing or the second housing, the lock mechanisms of the electronic device in the present invention have longer life than that of the conventional lock mechanism.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
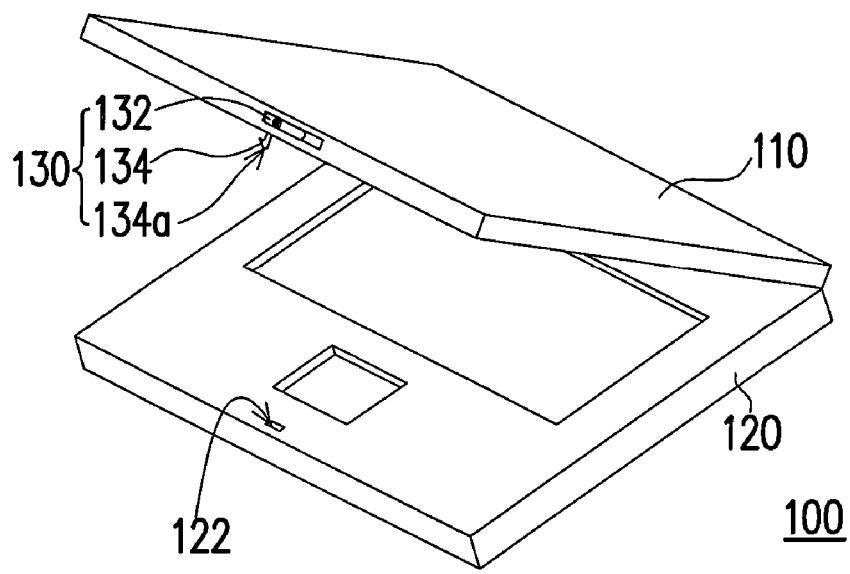
FIG. 1 is a diagram of a conventional electronic device.
Figure 2:
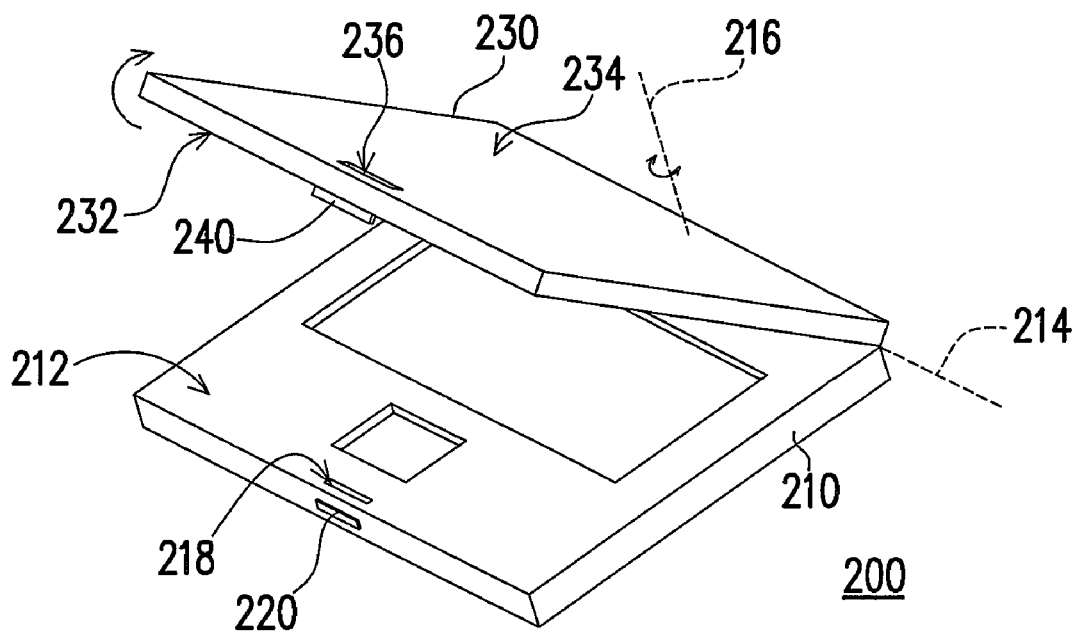
FIG. 2 is a diagram of an electronic device according to an embodiment in the present invention.

FIG. 2 is a diagram of an electronic device according to an embodiment in the present invention. Referring to FIG. 2, the electronic device 200 in the present embodiment is, for example, a notebook computer. The electronic device 200 includes a first housing 210, a first lock mechanism 220, a second housing 230, and a second lock mechanism 240.

As described above, the first housing 210 has a first surface 212, and the first housing 210 further has a first opening 218 located at the first surface 212.

Figure 3:
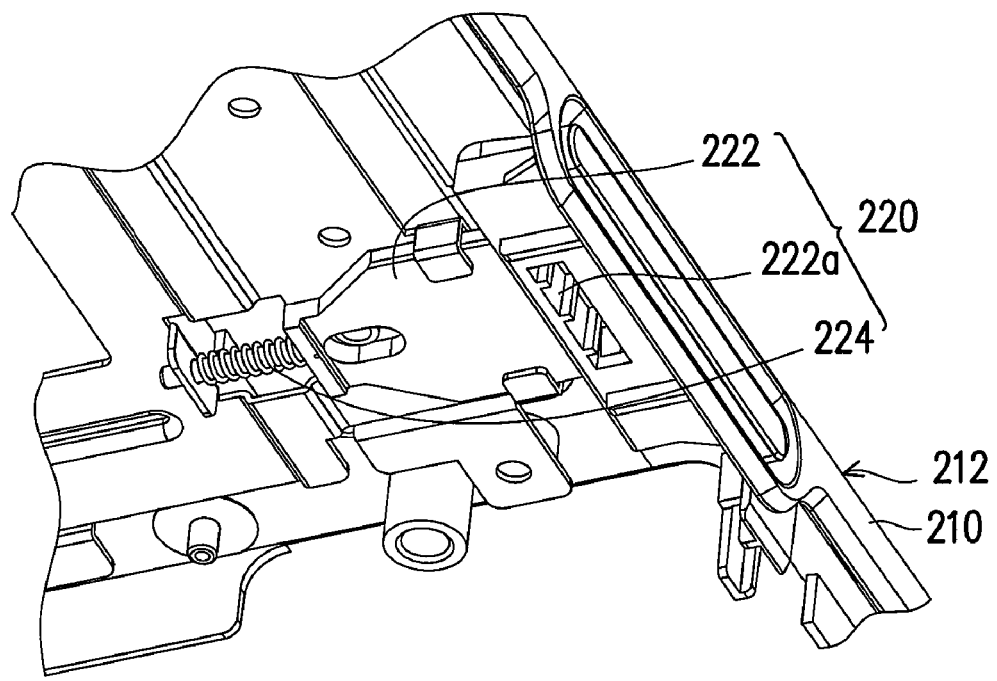
FIG. 3 is a diagram illustrating the first lock mechanism of an electronic device shown in FIG. 2.

FIG. 3 is a diagram illustrating the first lock mechanism of an electronic device shown in FIG. 2. Referring to FIG. 2 and FIG. 3 at the same time, the first lock mechanism 220 is disposed in the first housing 210, and the first opening 218 exposes a portion of the first lock mechanism 220. In the present embodiment, the first lock mechanism 220 includes a first slider 222 and a first elastic component 224, wherein the first slider 222 has a first locking portion 222a located in the first opening 218, and the first opening 218 exposes the first locking portion 222a. In the present embodiment, the first locking portion 222a is a lock clasp. Besides, the first elastic component 224 is disposed between the first slider 222 and the first housing 210, and the first elastic component 224 in the present embodiment is a spring so that when the user moves the first slider 222, the first elastic component 224 is pressed and stores a potential energy, and when the user stops moving the first slider 222, the first elastic component 224 provides an elasticity to send the first slider 222 back to its original position.

Referring to FIG. 2 again, the second housing 230 has a second surface 232 and a third surface 234 respectively disposed at the two opposite sides of the second housing 230. In the present embodiment, the second housing 230 is pivoted to the first housing 210 and is suitable for rotating relatively to the first housing 210 to get close to or away from the first housing 210. In specific, the first housing 210 has a first shaft 214, and the second housing 230 rotates relatively to the first housing 210 with the first shaft 214 as an axis so that the second housing 230 can be closed or opened in relative to the first housing 210. Moreover, the first housing 210 may further include a second shaft 216 perpendicular to the first shaft 214, and the second housing 230 can rotate relatively to the first housing 210 with the second shaft 216 as an axis. Thus, the user can choose the second surface 232 or the third surface 234 of the second housing 230 to face the first surface 212 of the first housing 210 according to the requirement.

Figure 4:
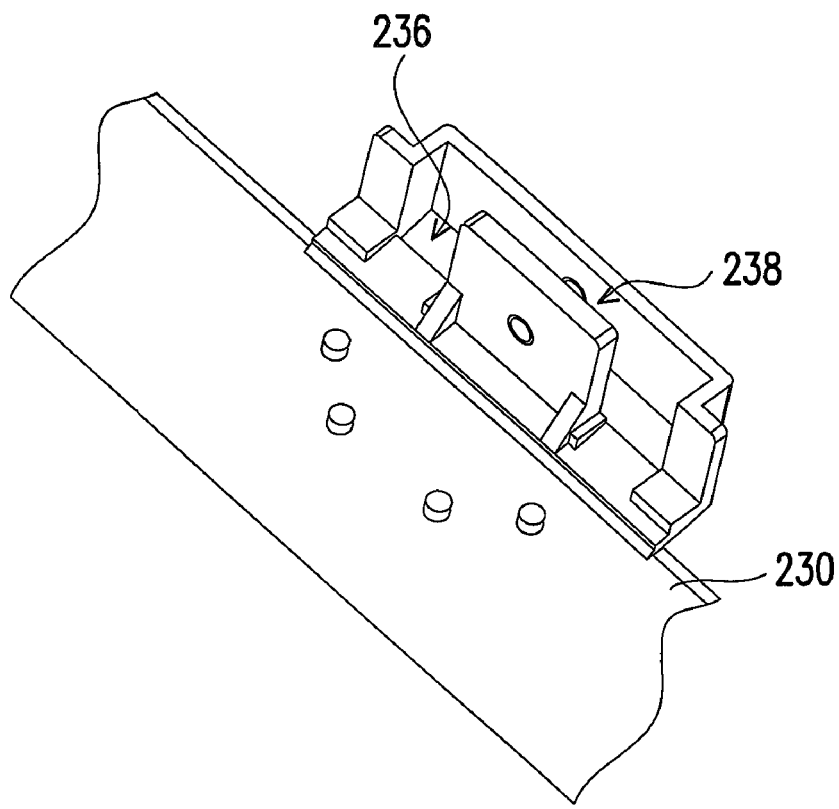
FIG. 4 is a partial view of the second housing according to the embodiment of the present invention.

FIG. 4 is a partial view of the second housing according to the embodiment of the present invention. Referring to both FIG. 2 and FIG. 4, the second housing 230 may further include a second opening 236 which is through the second housing 230, and at least a guiding structure 238 is disposed in the second housing 230 and close to the second opening 236.

Figure 5:
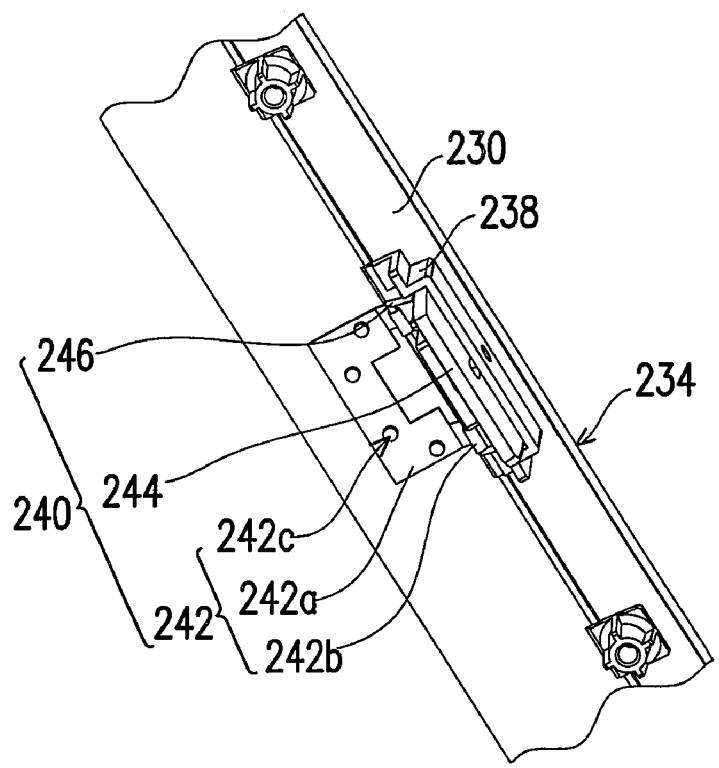
FIG. 5 is a diagram illustrating the second lock mechanism of an electronic device according to the embodiment of the present invention.
Figure 6:
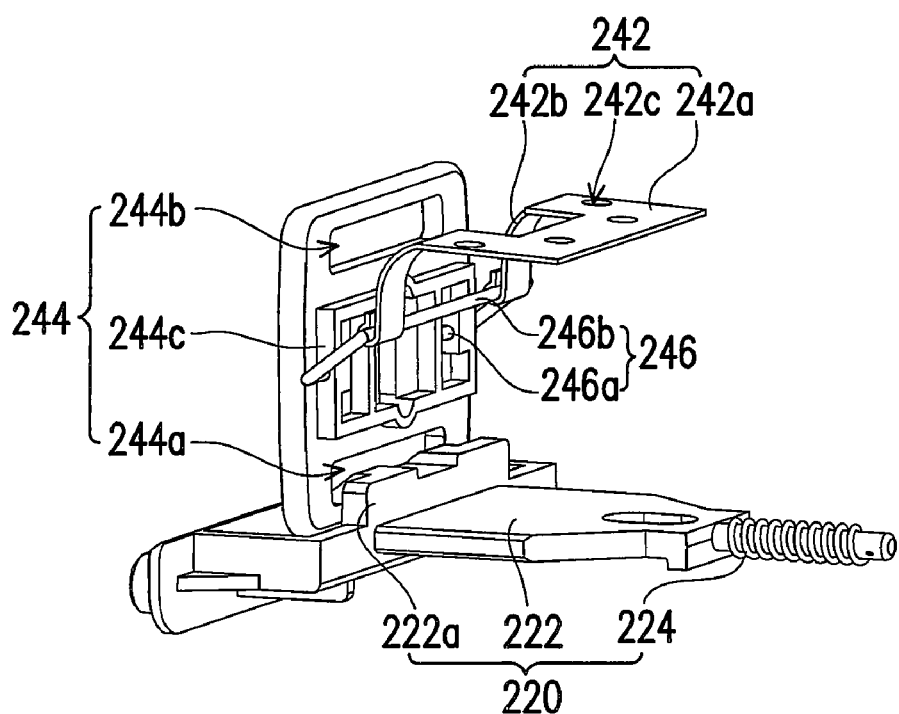
FIG. 6 is a diagram illustrating the situation when the first lock mechanism and the second lock mechanism are locked.

FIG. 5 is a diagram illustrating the second lock mechanism of an electronic device, and FIG. 6 is a diagram illustrating the situation when the first lock mechanism and the second lock mechanism are locked. Referring to both FIG. 5 and FIG. 6, the second lock mechanism 240 includes a second elastic component 242, a second slider 244, and a connector 246. In the present embodiment, the second elastic component 242 is an elastic plate which has a fixing portion 242a and an elastic arm 242b, wherein the fixing portion 242a has at least a third opening 242c, and a plurality of screws penetrates through the third openings 242c to fix the second elastic component 242 to the second housing 230.

Next, referring to FIGS. 4~6 at the same time, the second slider 244 is disposed in the guiding structure 238 and has a first portion 244a, a second portion 244b, and a pivotal portion 244c disposed between the first portion 244a and the second portion 244b. In the present embodiment, the first portion 244a and the second portion 244b are grooves to be locked with the first locking portion 222a in the present embodiment. Moreover, in the present embodiment, the connector 246 is a wire having a first connecting portion 246a and a second connecting portion 246b, wherein the pivotal portion 244c has a fourth opening 244d and the first connecting portion 246a is pivoted to the pivotal portion 244c through the fourth opening 244d, and the second connecting portion 246b is pivoted to the elastic arm 242b.

Next referring to FIGS. 2, 5, and 6, since the second slider 244 is pivoted to the second elastic component 242 through the connector 246, the user can make the second slider 244 slide in the guiding structure 238 by pushing the second slider 244, so as to selectively make the first portion 244a or the second portion 244b of the second slider 244 protruded from the third surface 234 to be locked with the first locking portion 222a.

Figure 7:
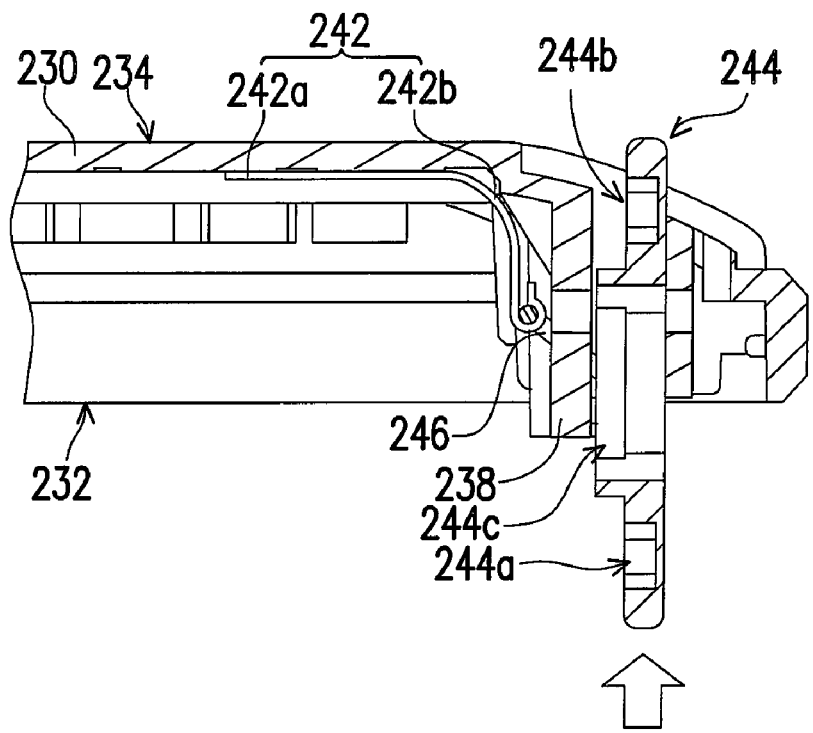
FIG. 7 is a diagram illustrating the first portion of the second slider being protruded from the second surface when the second surface is facing the first surface.

Next, referring to FIGS. 2, 5, and 6 again, when the user has not opened up the electronic device 200, that is, when the first surface 212 of the first housing 210 is closed to the second surface 232 of the second housing 230, the first locking portion 222a is locked with the first portion 244a. Here, the user can push the first lock mechanism 220 to move the first slider 222, so as to separate the first locking portion 222a from the first portion 244a; and then the user can flip the second housing 230 open to take the second surface 232 away from the first surface 212. FIG. 7 is a diagram illustrating the first portion of the second slider being protruded from the second surface when the second surface is facing the first surface. As shown in FIG. 7, here the first portion 244a of the second slider 244 is protruded from the second surface 232.

Since the second housing 230 can rotate relatively to the first housing 210 with the second shaft 216 as an axis, the user can rotate the second housing 230 to make the third surface 234 face the first surface 212.

Figure 8:
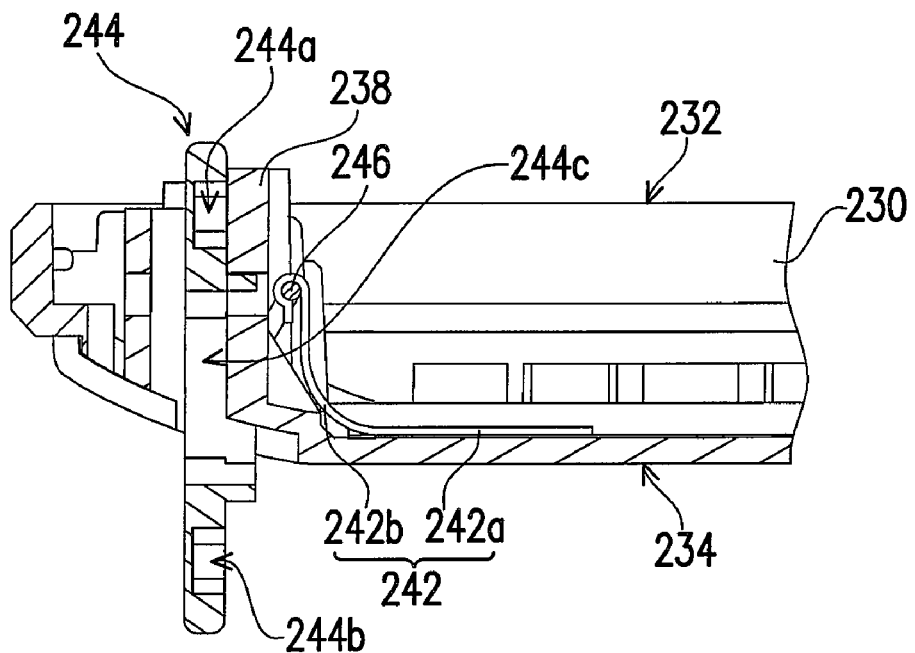
FIG. 8 is a diagram illustrating the second portion of the second slider being protruded from the third surface when the third surface is facing the first surface.

FIG. 8 is a diagram illustrating the second portion of the second slider being protruded from the third surface when the third surface is facing the first surface. Referring to FIG. 7 and FIG. 8 at the same time, when the user wants to close the electronic device 200, that is, to make the first surface 212 of the first housing 210 close to the third surface 234 of the second housing 230, the user can push the second slider 244, here the second slider 244 can slide stably and smoothly in the guiding structure 238 through the interaction between the second elastic component 242 and the connector 246, so as to hide the first portion 244a in the second housing 230 and protrude the second portion 244b from the third surface 234. Then, the user rotates the second housing 230 towards the first housing 210 with the first shaft 214 as an axis so that the second housing 230 moves towards the first housing 210 to close the electronic device 200. Besides, due to the structural cooperation between the first locking portion 222a and the second portion 244b, the first locking portion 222a is locked with the second portion 244b. It should be noted that even though the first locking portion 222a as a lock clasp and the first portion 244a, the second portion 244b as grooves are used as an example in the present embodiment, other lock structure which can work cooperatively can be used to replace the first locking portion 222a, the first portion 244a, and the second portion 244b by those skilled in the art, and structures and patterns of the first locking portion 222a, the first portion 244a, and the second portion 244b are not limited in the present invention.

Similarly, if the user wants to make the second surface 232 of the second housing 230 be closed to the first surface 212 of the first housing 210 so as to close the electronic device 200, the user can push the second portion 244b of the second slider 244 to make the second slider 244 slide in the guiding structure 238, and through the interaction between the second elastic component 242 and the connector 246, the second portion 244b is hidden in the second housing 230, so that the first portion 244a is protruded from the second surface 232. Thus, when the first surface 212 is closed to the second surface 232, the first portion 244a is locked with the first locking portion 222a.

In particular, since the second slider 244 is pivoted to the second elastic component 242 through the connector 246, the moving distance of the second slider 244 is limited by the connector 246 and the second elastic component 242. Thus, when the user pushes the second slider 244 to protrude the second portion 244b from the third surface 234 or to protrude the first portion 244a from the second surface 232, the second elastic component 242 can go back to its original position accurately.

In overview, the electronic device in the present invention has at least following advantages:

1. The second slider can move stably back and forth in the guiding structure through the elasticity of the second elastic component and the rotation of the connector, thus, the interactive stability of the lock mechanisms in the present invention is better than that in the conventional technology.

2. Collision between the second slider and the second housing can be prevented, thus, the lock mechanisms of the electronic device in the present invention have longer life than that of conventional lock mechanism.

3. The second elastic component and the connector limit the moving distance of the second slider, thus, the lock mechanisms of the electronic device in the present invention have such advantage as accurate reposition.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic device, comprising:
a first housing, having a first surface with a first opening;
a first lock mechanism, disposed in the first housing and comprising a movable first slider having a first locking portion disposed at the first opening;
a second housing, pivoted to the first housing, suitable for rotating relatively to the first housing, the second housing having a second surface, a third surface, and a guiding structure, wherein the second and the third surfaces are respectively disposed at two opposite sides of the second housing, and the guiding structure is disposed in the second housing; and
a second lock mechanism, disposed at the second housing, wherein the second lock mechanism comprises:
an elastic component, having a fixing portion and an elastic arm, the fixing portion being fixed to the second housing;
a second slider, disposed in the guiding structure and having a first portion, a second portion and at least one pivotal portion disposed between the first portion and the second portion; and
a connector, having a first connecting portion and a second connecting portion, wherein the first connecting portion is pivoted to the at least one pivotal
portion, and the second connecting portion is pivoted to the elastic arm,
when the second surface is close to the first surface and the first portion is protruded from the second surface, the first portion of the second slider being locked with the first locking portion of the first slider; and
when the third surface is close to the first surface and the second portion of the second slider is protruded from the third surface, the second portion of the second slider being locked with the first locking portion of the first slider.

2. The electronic device as claimed in claim 1, wherein the first housing further comprises a first shaft, and the second housing rotates relatively to the first housing with the first shaft as an axis.

3. The electronic device as claimed in claim 2, wherein the first housing further comprises a second shaft perpendicular to the first shaft, and the second housing rotates relatively to the first housing with the second shaft as an axis.

4. The electronic device as claimed in claim 1, wherein the first lock mechanism further comprises:
a first elastic component, disposed between the first slider and the first housing.

5. The electronic device as claimed in claim 4, wherein the first elastic component is a spring.

6. The electronic device as claimed in claim 1, wherein the first locking portion is a lock clasp, and the first portion and the second portion are grooves.

7. The electronic device as claimed in claim 1, wherein the second housing further comprises a second opening formed through the second housing, the at least one guiding structure is disposed in the second housing and close to the second opening, and the second slider is disposed in the second opening.

8. The electronic device as claimed in claim 1, wherein the second elastic component is an elastic plate, the fixing portion has at least one third opening, and a plurality of screws penetrate through the third opening to fix the second elastic component to the second housing; and the connector is a wire, and the at least one pivotal portion has a fourth opening and the first connecting portion is pivoted to the pivotal portion through the fourth opening.

9. An electronic device, comprising:
a first housing;
a first lock mechanism, disposed in the first housing and comprising a movable first slider having a first locking portion disposed at a first opening of the first housing;
a second housing, pivoted to the first housing, suitable for rotating relatively to the first housing, the second housing having top and bottom surfaces and a guiding structure; and
a second lock mechanism, disposed at the second housing, wherein the second lock mechanism comprises:
an elastic component being fixed to the second housing;
a second slider movably disposed in the guiding structure; and
a connector pivotally connected to the second slider and the elastic component respectively;
wherein the second slider has a first portion and a second portion alternatively protruding from the second housing and locked with the first locking portion of the first slider when either the top or the bottom surface of the second housing is facing the first housing.

10. The electronic device as claimed in claim 9, wherein the first housing further comprises a first shaft, and the second housing rotates relatively to the first housing with the first shaft as an axis.

11. The electronic device as claimed in claim 10, wherein the first housing further comprises a second shaft perpendicular to the first shaft, and the second housing rotates relatively to the first housing with the second shaft as an axis.

12. The electronic device as claimed in claim 9, wherein the first lock mechanism further comprises:
a first elastic component, disposed between the first slider and the first housing.

13. The electronic device as claimed in claim 12, wherein the first elastic component is a spring.

14. The electronic device as claimed in claim 9, wherein the first locking portion of the first slider is a lock clasp, and the first portion and the second portion of the second slider are grooves.

15. The electronic device as claimed in claim 9, wherein the second housing further comprises a second opening formed through the second housing, the at least one guiding structure is disposed in the second housing and close to the second opening, and the second slider is disposed in the second opening.

* * * * *